US012493465B2

(12) United States Patent
Burgess et al.

(10) Patent No.: US 12,493,465 B2
(45) Date of Patent: Dec. 9, 2025

(54) VECTOR LOAD STORE OPERATIONS IN A VECTOR PIPELINE USING A SINGLE OPERATION IN A LOAD STORE UNIT (71) Applicant: SiFive, Inc., San Mateo, CA (US)

(72) Inventors: Bradley Gene Burgess, Sunset Valley, TX (US); David Kravitz, Cambridge, MA (US); Alexandre Solomatnikov, San Carlos, CA (US)

(73) Assignee: SiFive, Inc., Santa Clara, CA (US)

( * ) Notice: Subject to any disclaimer, the term of this patent is extended or adjusted under 35 U.S.C. 154(b) by 173 days.

(21) Appl. No.: 18/524,222

(22) Filed: Nov. 30, 2023

(65) Prior Publication Data

US 2024/0184576 A1    Jun. 6, 2024

Related U.S. Application Data (60) Provisional application No. 63/429,868, filed on Dec. 2, 2022.

(51) Int. Cl.
*G06F 9/30*       (2018.01)
(52) U.S. Cl.
CPC ...... *G06F 9/30036* (2013.01); *G06F 9/30043* (2013.01); *G06F 9/3012* (2013.01)
(58) Field of Classification Search
CPC .................................................. G06F 9/30036
See application file for complete search history.

(56) References Cited

U.S. PATENT DOCUMENTS

2015/0026685 A1*  1/2015  Spadini ............... G06F 9/30043
                                                              712/216
2020/0159535 A1*  5/2020  Bonanno ................. G06F 9/384

* cited by examiner

*Primary Examiner* — Michael J Metzger
(74) *Attorney, Agent, or Firm* — Kilpatrick Townsend & Stockton LLP (57) ABSTRACT Systems and methods are disclosed for transferring data between a memory system and a vector register file. For example, a system may include a vector pipeline including a vector physical register file; a load store unit; one or more pipeline stages configured to decode a vector memory instruction to obtain a macro-operation and dispatch the macro-operation to both the load store unit and the vector pipeline, and a baler circuitry, including a buffer with entries. The vector pipeline is configured to crack the macro-operation into multiple micro-operations. The baler circuitry is configured to implement the multiple micro-operations to transfer data between one or more selected entries of the buffer and respective registers of the vector physical register file. The load store unit is configured to implement the macro-operation to transfer data between one or more addresses in a memory system and the one or more selected entries of the buffer.

20 Claims, 6 Drawing Sheets

VECTOR LOAD STORE OPERATIONS IN A VECTOR PIPELINE USING A SINGLE OPERATION IN A LOAD STORE UNIT

CROSS-REFERENCE TO RELATED APPLICATION(S)

This application claims priority to and the benefit of U.S. Provisional Patent Application Ser. No. 63/429,868, filed Dec. 2, 2022, the entire disclosure of which is hereby incorporated by reference.

TECHNICAL FIELD

This disclosure relates generally to central processing units or processor cores and, more specifically, to loading and storing vector data using a single operation in a load store unit.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An Instruction Set Architecture (ISA) (such as the RISC-V ISA) may implement scalar and vector instructions. Scalar instructions take arguments that consist of a single element of data and vector instructions take arguments that may include multiple elements of data to be processed by a single instruction. Scalar instructions may be implemented in a scalar pipeline and vector instructions may be implemented in a vector pipeline. Each pipeline may have their own physical registers storing operands for execution in their respective pipeline. For example, the scalar pipeline may have scalar registers storing single element operands and the vector pipeline may have vector registers storing multi-element operands. In some implementations, the scalar pipeline and the vector pipeline may be portions of a larger pipeline and may share some stages (e.g., one or more shared fetch stages and a shared instruction decode stage). A load store unit transfers data from memory to a pipeline and from a pipeline to memory.

Implementations of this disclosure are designed to improve the performance and efficiency of an integrated circuit with a processor core having a vector pipeline by interposing a buffer between a load store unit and the vector registers of the vector pipeline. A vector memory instruction (e.g., a vector load instruction or a vector store instruction) may be dual dispatched, as a macro-operation (macro-op), to the load store unit and to the vector pipeline, which may in turn crack the macro-op corresponding to the vector memory instruction into multiple micro-operations (micro-ops) that transfer data between the buffer and respective vector registers of the vector pipeline using a data path, which may be narrower than the longest supported vectors. The load store unit may be configured to transfer data between collection memory locations (e.g., specified by a base address and a stride parameter, a base address and an array of indices, and/or a mask register) and the buffer. The macro-op for the vector memory instruction that is dual dispatched and the corresponding micro-ops on the vector pipeline side of the buffer may be associated with a common identifier (e.g., a reorder buffer identifier) that is used to coordinate the handoff (e.g., asynchronous handoff) of data in the buffer from the macro-op executing in the load store unit to the corresponding micro-ops executing in the vector pipeline or vice versa. Using the buffer to decouple the transfer to/from memory from the transfer from/to locations in a vector register file of the vector pipeline may provide a number of advantages. For example, the vector register renaming name space may be decoupled from the load store unit. For example, the load store may have to process only a single operation in its issue queue rather than tracking a large collection of micro-ops associated with different vector register accesses. This decoupling may prevent backups of the load store unit, which may be shared with scalar pipeline of the processor core and improve performance.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Figure 1:
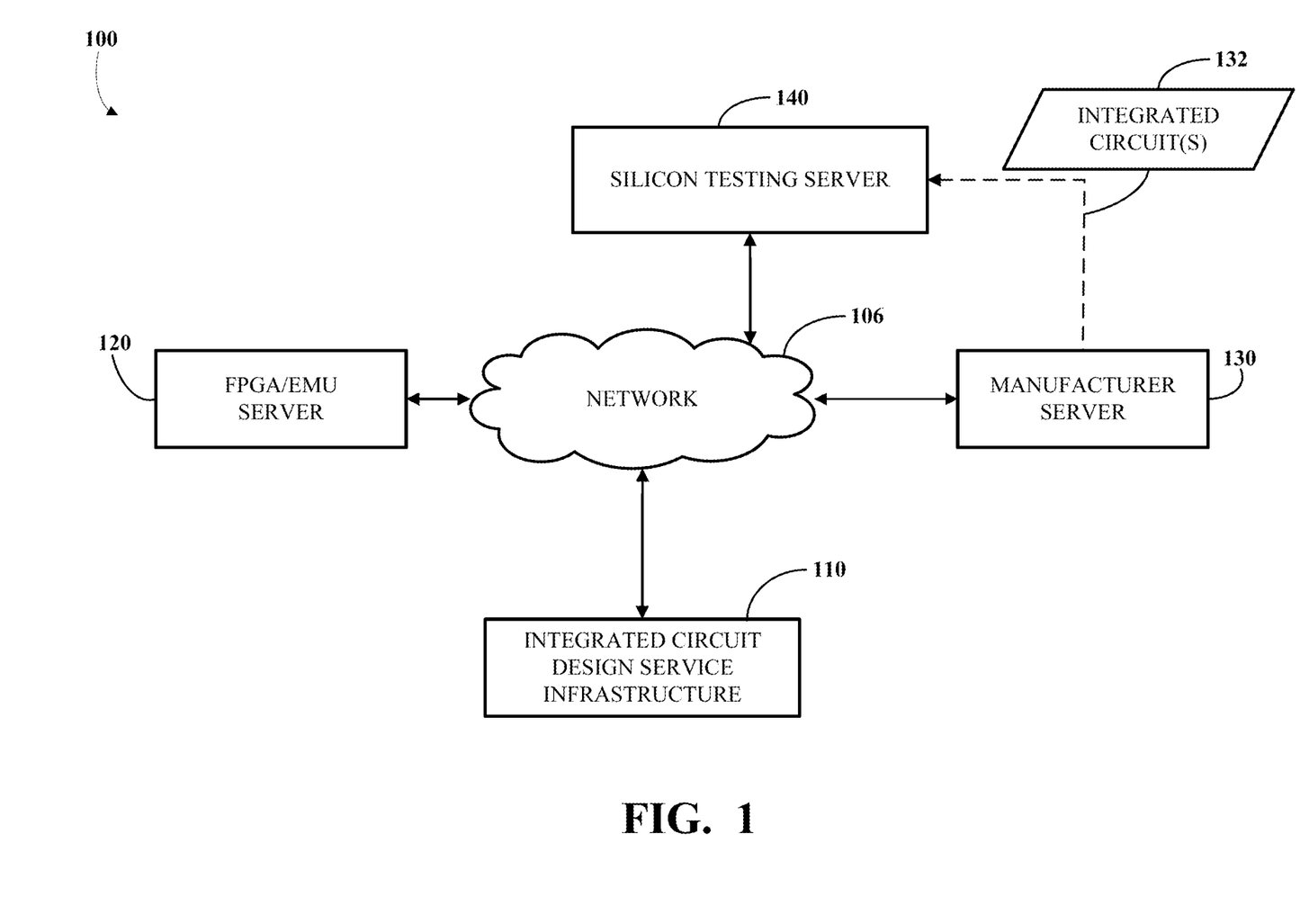
FIG. 1 is a block diagram of an example of a system for facilitating generation and manufacture of integrated circuits.

To describe some implementations in greater detail, reference is first made to examples of hardware and software structures used to implement a system including components that may load and store vector data using a single operation in a load store unit. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
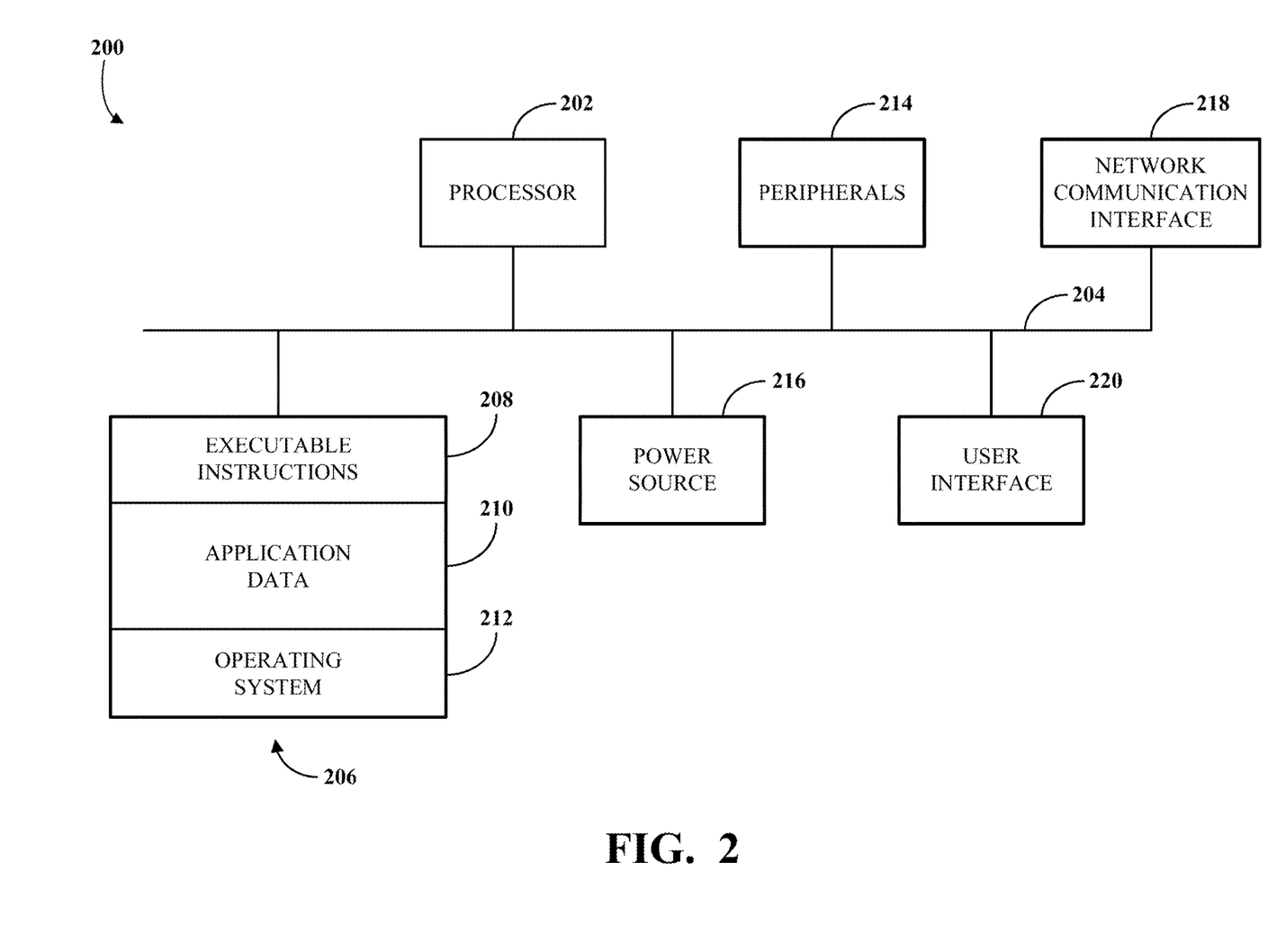
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
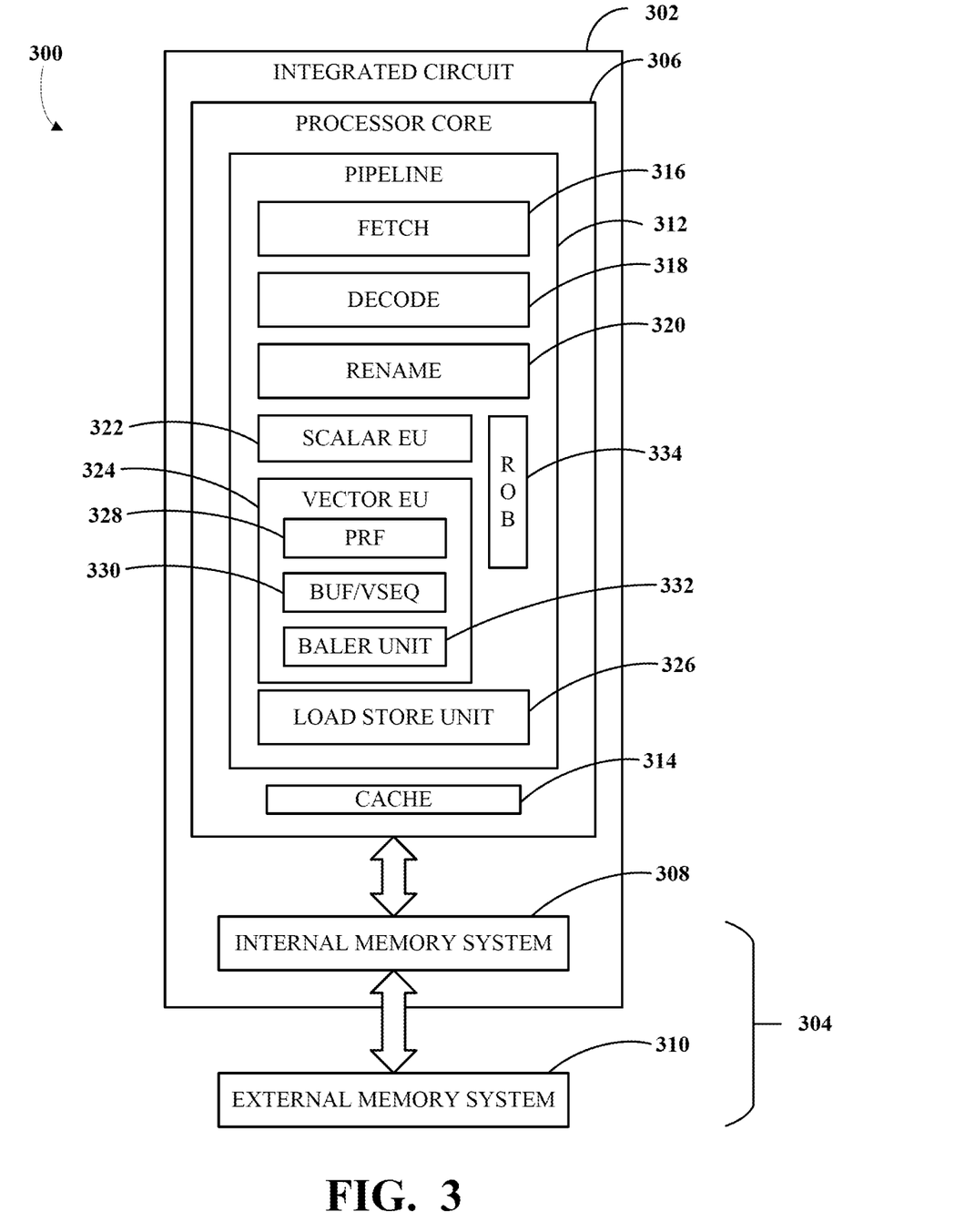
FIG. 3 is a block diagram of an example of a system for implementing vector memory instruction in a vector pipeline using a single operation in a load store unit.

FIG. 3 is a block diagram of an example of a system 300 including an integrated circuit 302 and a memory system 304 that implements a single memory macro-operation (macro-op) for a load store unit (LSU) when executing vector memory instructions. The integrated circuit 305 includes at least one processor core 306 and can be implemented, for example, as a field-programmable gate array (FPGA), an application-specific integrated circuit (ASIC), or a system-on-chip (SoC). The memory system 304 may include an internal memory system 308, an external memory system 310, or both an internal memory system 308 and an external memory system 310. The internal memory system 308 may be in communication with the external memory system 310. The internal memory system 308 may be internal to the integrated circuit 302 (e.g., implemented by the FPGA, the ASIC, or the SoC). The external memory system 310 may be external to integrated circuit 302 (e.g., not implemented by the FPGA, the ASIC, or the SoC of the integrated circuit 302). The internal memory system 308 may include, for example, a controller and memory, such as random access memory (RAM), static random access memory (SRAM), cache, and/or a cache controller, such as a level three (L3) cache and an L3 cache controller. The external memory system 310 may include, for example, a controller and memory, such as dynamic random access memory (DRAM) and a memory controller. In some implementations, the memory system 304 may include memory mapped inputs and outputs (MMIO), and may be connected to non-volatile memory, such as a disk drive, a solid-state drive, flash memory, and/or phase-change memory (PCM).

The processor core 306 includes circuitry for executing instructions and can include one or more pipelines, such as pipeline 312, and cache memory 314. The processor core 306 fetches instructions and executes the instructions in the one or more pipelines, for example, as part of a program sequence. The instructions may cause memory requests (e.g., write requests and read requests) that the one or more pipelines transmit to the cache memory 314 to write or read data stored in the cache memory.

The pipeline 312 includes fetch logic 316 for fetching instructions from the cache memory 314, decode logic 318 for decoding instructions into operations and steering the operations to the appropriate execution unit, rename logic 320 for renaming register arguments of instructions from logical registers to registers in a physical register file (PRF), a scalar execution unit 322 for executing operations having single element operands, a vector execution unit 324 for executing operations having a multi-element operand, and a load store unit (LSU) 326 for transferring data between the cache memory 314 and the pipeline 312. Although FIG. 3 shows the scalar execution unit 322 and the vector execution unit 324 having shared decode logic 318, and rename logic 320, in some implementations, the scalar execution unit 322 and the vector execution unit 324 can have separate decode logic and rename logic that may supplement or replace the shared decode logic 318 and rename logic 320. Additionally, the scalar execution unit 322 and the vector execution unit 324 can have separate dispatch units, execution units, physical and/or virtual registers, caches, queues, data paths, and/or other logic associated with instruction flow. The scalar execution unit 322 and the vector execution unit 324 may share a reorder buffer (ROB) 334 for arranging out-of-order operations to execute in-order.

Implementations of this disclosure are designed to improve the efficiency of vector memory instructions by using a common LSU 326 for the scalar execution unit 322 and the vector execution unit 324. The decode logic 318 can generate a single macro-op for the LSU 326 and steer the macro-op to the LSU 326 and the vector execution unit 324 for executing the vector memory instruction. The vector execution unit 324 can crack the macro-op to generate associated memory micro-ops for catching data from the LSU 326. The associated memory micro-ops can contain rename register tags for the memory instruction. For a vector load, the LSU 326 sends multiple retrieved elements of data to the vector execution unit 324 which are caught by the vector execution unit 324 and written/forwarded using the PRF tags of the associated memory micro-ops. An association between the memory macro-op sent to the LSU 326 and the catching micro-ops generated by the vector execution unit 324 may be tracked using a reorder buffer identifier (ROB-ID) or a "color" assigned by the decode logic 318.

The vector execution unit 324 includes a physical register file 328 for storing vector operands, a buffer/sequencer 330 for cracking a macro-op into multiple micro-ops, and a baler unit 332 for assembling full vector register width data, translating between memory references and register segment for segmented loads and stores, masking undisturbed loads, tailing undisturbed loads, and translating between ROB-ID tags and vector PRF numbers. The relationship between the LSU 326 and the baler unit 332 and the manner in which they work together will be described in more detail with reference to FIG. 4.

Figure 4:
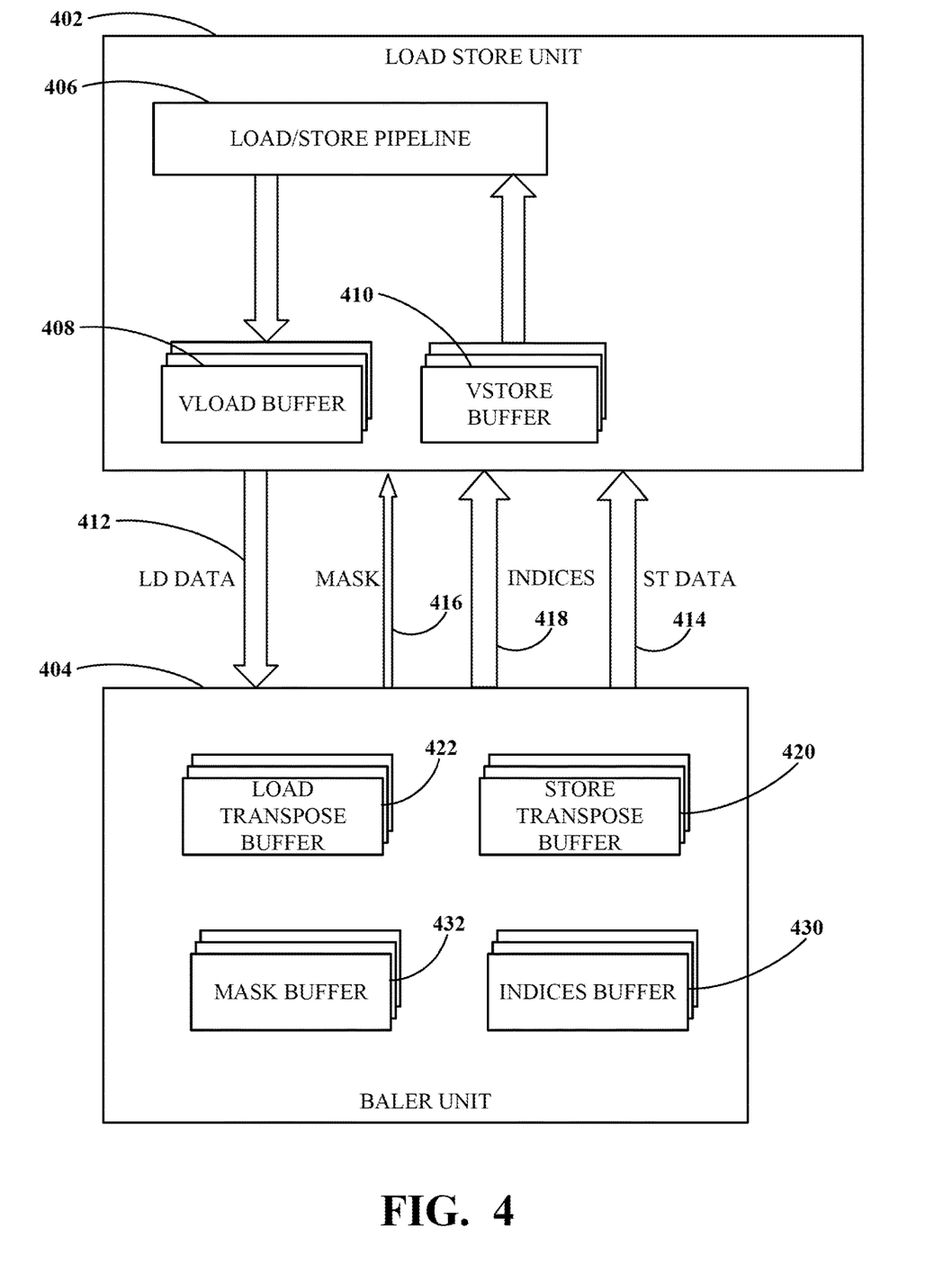
FIG. 4 is a block diagram of an example load/store unit and a baler for implementing vector memory instructions in a vector pipeline using a single operation in a load store unit.

FIG. 4 is a block diagram illustrating a load store unit 402 and a baler unit 404 and their interaction with one another. The implementation of vector register width memory instructions is partitioned between the load/store unit 402 and the baler unit 404. A decoder, such as decode logic 318, decodes a vector memory instruction into a macro-op for the load store unit 402 and the baler unit 404. The macro-op is further cracked into multiple micro-ops for execution by the vector pipeline. The macro-op may be cracked by the decoder or may be cracked by a second decoder within the vector pipeline. In at least one implementation, a decoder may steer up to eight micro-ops for a baler unit 404 for each memory instruction. The micro-ops steered to the baler unit 404 can include a resource tag for identifying a memory instruction associated with the micro-op. When loading load data 412 from the LSU 402, the baler unit 404 dereferences the resource tag to provide a PRF number for the load data 412. Similarly, when the baler unit 404 provides store data 414 back to the LSU 402, such as when storing data, the baler unit 404 provides the store data 414 with the resource tag to inform the LSU 402 which instruction the store data 414 is for.

The LSU 402 executes the macro-op and, when the macro-op is generated from a vector load instruction, the LSU 402 returns a vector register width result as load data 412 for the baler unit 404. When the macro-op is generated from a vector store instruction, the LSU 402 receives a vector register width result as store data 414 from the baler unit 404. The LSU 402 may also receive a vector register width result as index data 418 from the baler unit 404, which includes indices for scatter-gather/indexed store or indexed load instruction. The baler unit 404 may be configured to assemble the index data 418 in an indices buffer 430 using one or more micro-ops to gather the index data 418 corresponding to a register of load data 412 or a register of store data 414 from the physical register file of the vector unit. The baler unit 404 may also generate a partial mask 416 that is stored in a mask buffer 432 and sent to the LSU 402 and is used by the LSU 402 to suppress element accesses.

The load store unit 402 includes a load/store pipeline 406, a vector load buffer 408, and a vector store buffer 410. The load/store pipeline 406 executes load store operations to transfer data to and from memory locations and to the vector load buffer 408 and from the vector store buffer 410. The vector load buffer 408 holds load data 412 loaded by the load/store pipeline 406 and sends the load data 412 to the baler unit 404 when the vector load buffer 408 is full or the baler unit 404 requests the load data 412. Similarly, the vector store buffer 410 holds store data 414 sent to the LSU 402 from the baler unit 404 until the vector store buffer 410 is full or the load store pipeline 406 is ready to receive the store data.

The LSU 402 is configured to handle aspects of calculating the effective addresses for the data (e.g., handling page translations), checking/recording faults, performing the operation(s) of retrieving the data from or storing data to a memory location using the load/store pipeline 406, putting pieces of data together to generate a full register width result using the vector load buffer 408, and returning register width data from the vector store buffer 410. The LSU 402 may be configured to internally process multiple elements for a scatter gather operation, internally process multiple elements for a strided memory operation, handle misalignment, handle memory types, and handle multiple atomics (e.g., at the individual element level).

The baler unit 404 is responsible for reading or forwarding registers of the vector pipeline to the LSU 402, for filling in undisturbed mask and tail elements, and for handling the data shuffling for memory segments. Vector load segment instruction takes one or more structures (each a contiguous block in memory), extracts uniform sized elements from each structure and packs the elements in separate registers. A portion (NFIELDS) of the macro-op code or associated microarchitectural state of the processor (e.g., set with special instructions, such as, the vset instruction in the RISC-V instruction set architecture) specifies the number of elements within a structure, another portion (EEW) specifies the width of the elements, and another portion (VL) defines how many structures to process. Multiplying the width of the elements and the number of elements in the structure represents the number of touched registers for the load operation. Vector store segments are analogous but going the opposite direction.

The baler unit 404 uses 1-micro-op per destination register. The LSU 402 receives a single macro-op and sequences the macro-op passing data pieces to the baler unit 404. For smaller structures using unit stride, the LSU 402 can return multiple structures at a time. For structures larger than a register width, the LSU 402 transfers full register width packets to the baler unit 404, and a last partial packet if needed. The last transfer can be combined with a subsequent structure being loaded. For structures smaller than or equal to a register width, the LSU 402 packs as many whole structures as possible into each packet (no partial structures in a packet).

The baler unit 404 connects a vector execution unit to the LSU 402. In some implementations, the baler unit 404 assembles full-register width data for unaligned unit-stride loads, non-unit stride (aka strided) loads, and indexed loads. In some implementations, the LSU 402 assembles full-register width data for unaligned unit-stride loads, non-unit stride (aka strided) loads, and indexed loads. For segmented loads and stores, the baler unit 404 may translate between memory references and register segments of the vector execution unit. The baler unit 404 may also handle undisturbed loads in which incoming load data 412 is combined with "old" data from the register file and tail undisturbed loads in which the tail of the incoming load data 412 is undisturbed loads. Additionally, the baler unit 404 may translate between ROB ID tags and vector PRF numbers.

The baler unit 404 can include a load transpose buffer 422 to implement segment loads (up to 8 segments). In some implementations, the load transpose buffer 422 includes a register file with 8 entries, 1 write port, and 8 read ports. The load transpose buffer 422 may implement double buffering to achieve full throughput requiring the number of entries to be at least 16. Similarly, to implement segment stores (up to 8 segments), the baler unit 404 may include a store transpose buffer 420 having a register file with 8 entries, 8 write ports and 1 augmented read port. Double buffering may be implemented to achieve full throughput. The load transpose buffer 422 and the store transpose buffer 420 can also be used as buffers for non-segment vector loads and stores, allowing de-coupling of the scalar/LSU pipelines and the vector pipeline.

The baler unit 404 can supply a list of entry numbers to the LSU 402 that the LSU 402 will send back to the baler unit 404 when claiming entries. The list will indicate a starting entry number, along with a valid bit, for each possible LMUL value (1, 2, 4, 8). Loads with fractional LMUL values can use the LMUL=1 value and result in reserving an entire entry in the baler unit. When the LSU 402 claims an entry, the list is updated to reflect the next available entry for each LMUL value. The baler unit 404 may provide the same entry number for multiple LMUL values. For instance, an empty baler unit 404 can present Entry 0 for all LMUL values. For this reason, claim requests from the baler unit 404 can include the LMUL indicating how many entries to reserve in the baler unit 404.

When handling misaligned loads, load data 412 from consecutive "ideal load cycles" can arrive to the baler unit 404 packed into one data cycle. The load data can be written in memory order and the load data can be read as segments. Each element can have a single write data port (with byte enables for 2 entries) and 8 read ports per element. In some implementations, a system with multiple load or load-store pipelines can have one write port per pipeline, allowing references to issue simultaneously to reduce overall latency.

Although FIG. 4 shows the vector load buffer 408 and the load transpose buffer 422 as distinct structures in the LSU 402 and the baler unit 404, in some implementations, the vector load buffer 408 and the load transpose buffer 422 can be combined into a single load/transpose buffer the features of both the vector load buffer 408 and the load transpose buffer 422.

The datapath and control of the store transpose buffer 420 may be similar to that of the load transpose buffer 422. However, all the transpose mappings are inverted. In addition, the store transpose buffer 420 does not need to deal with misalignment directly as the LSU store datapath can shift elements into the proper alignment. In some implementations, the store transpose buffer 420 includes 8 write ports and 1 read port.

Although FIG. 4 shows the vector load buffer 408 and the load transpose buffer 422 as distinct structures in the LSU 402 and the baler unit 404, in some implementations, the vector load buffer 408 and the load transpose buffer 422 can be combined into a single load/transpose buffer with the features of both the vector load buffer 408 and the load transpose buffer 422.

For indexed loads and stores, the vector execution unit can transfer address indices from the vector register file (VRF) to a dedicated vector length-width buffer that the LSU 402 can read during read register (RR) pipeline stage. Depending on the index size, a single buffer entry can supply between 2 and VLENB (vector register length in bytes) indices. For indexed stores, indices and store data transfers will alternate, with indices leading data. For indexed masked loads and stores, the index and mask can be sent with the same micro-op.

For masked loads and stores, the vector execution unit can transfer a portion of a VLEN mask for the masked load or store to a dedicated VLENB-width buffer that the LSU 402 can read during an RR pipeline stage to apply the mask to the load or store. For indexed masked loads and stores, the index and mask can be sent with the same micro-op.

The LSU 402 rotates vector load data 412 for proper element-to-vector-register alignment and sends the vector load data 412 to the load transpose buffer 422. In some implementations, there is not a separate alignment buffer. The space in the transpose buffer is claimed by the LSU 402 several clock cycles before the LSU 402 sends the data to the transpose buffer. "Claim" means pre-calculating condition and value, subtraction of count/credit is done in the next cycle. For non-segment loads, claiming entries per micro-op reduces the number of entries in the load transpose buffer 422 required for good performance. The load transpose buffer 422 can be claimed by the load store unit 402 in tandem with LoadQ entries. For segment loads, the LSU 402 claims space for the whole vector load because segment load data must be placed contiguously into the load transpose buffer 422 to simplify the mux selection used to transfer data to the vector PRF 328. The claim of the first micro-op can be done later. For example, the LSU 402 can be configured to delay the claim of load transpose buffer 422 entries until the LoadQ is ready to return the load data. That approach also reduces the number of entries in the load transpose buffer 422 required for good performance. Claim logic tracks by ROB ID which vector loads in flight are already claimed and ignore later claims for the same ROB ID.

In some implementations, to avoid deadlock, transpose buffer entries can be divided into two pools: "any" and "oldest". The "oldest" pool can only be used for the oldest LSU macro-op to ensure the oldest macro-op can make forward progress. The number of entries in the "oldest" pool can be 8 for a segment load that writes 8 vector registers. The same number of entries may be sufficient for non-segment loads. Buffer entries from the "any" pool can be used for LSU macro-ops issued out-of-order. In some implementations, the number of entries in the "any" pool can be selected to be sufficient for 8 segment loads and to cover memory latency and other latencies.

In some implementations, to avoid deadlock, the transpose buffer entries have a single pool and the LSU 402 can initiate a flush that frees resources allocated to younger instructions in order to satisfy the needs of older instructions.

Vector micro-ops are issued to read load data 412 from the load transpose buffer 422 and write the load data into the vector register file. Additionally, such vector micro-ops can read old values from the vector register file, merge the old values with data in the load transpose buffer 422 according to a mask. For masked and/or indexed vector loads and stores, a mask buffer and/or an index buffer can be used to send data from vector register file to the LSU. Mask/index buffer entries can be allocated when the first vector micro-op that reads the vector register file and/or mask is issued. Mask/index can be consumed by the LSU macro-op later. The LSU macro-op may not be issued until the mask and/or index vector registers are read.

An indexed vector load or store can read up to 8 vector registers for index and 1 vector register for mask and generate up to VLEN, e.g., 256, memory accesses. Such a large number of memory accesses can exhaust LSU resources, i.e., MSHRs, LoadQ entries, StoreQ entries. To minimize the frequency of this, indexed vector loads/stores with large number of indices are multi-played from LSU issue queue, therefore only 1 entry per index needs to be allocated.

For vector stores vector micro-ops read vector register file and write into the store transpose buffer 420. The store transpose buffer 420 entries are allocated when the first vector micro-op that reads the vector register file is issued. Store vector data is consumed by the LSU micro-op at a later time. The LSU macro-op can be issued before the store data 414 is ready.

Figure 5:
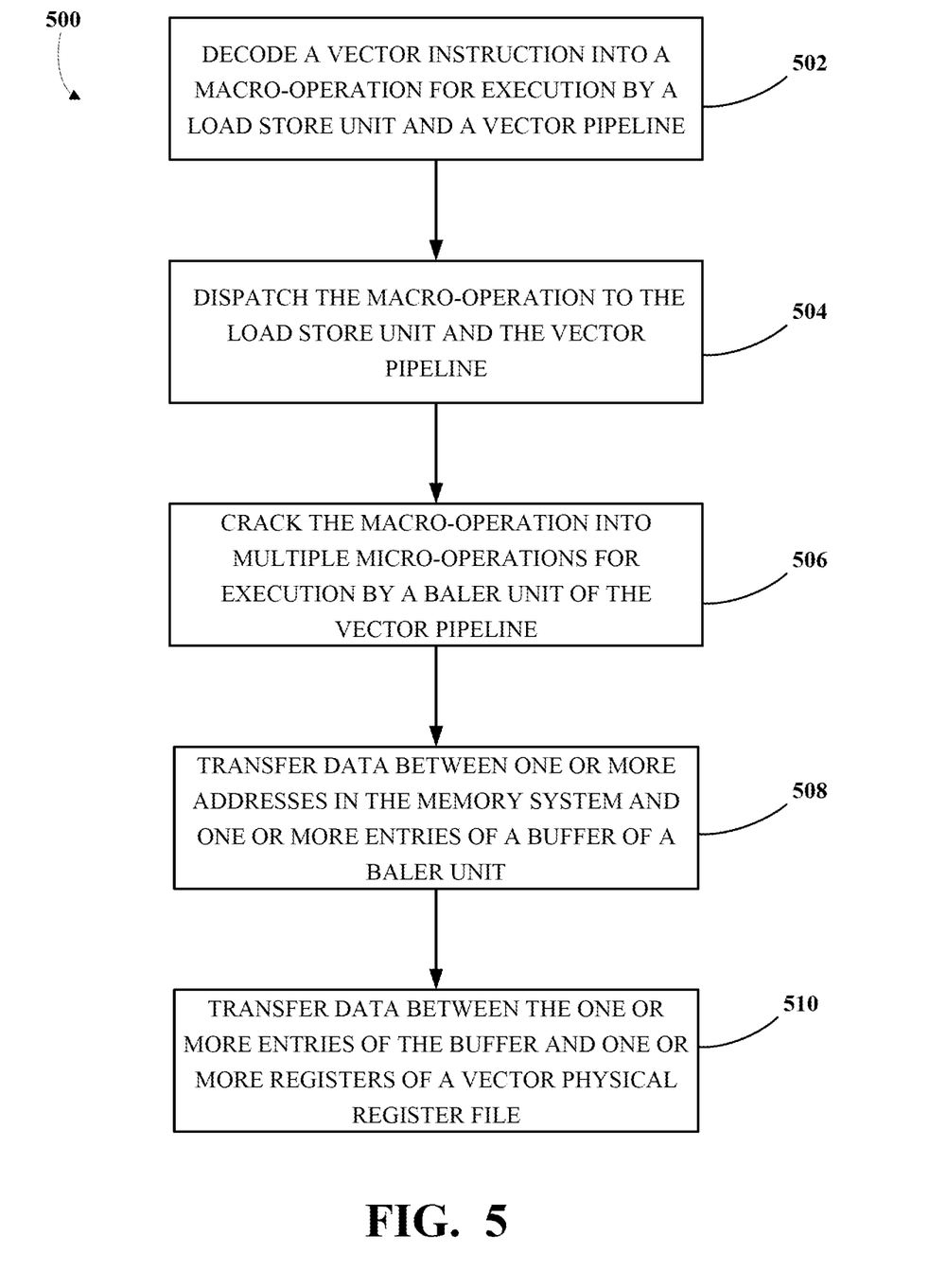
FIG. 5 is a flow chart of an example of a technique for implementing vector memory instructions in a vector pipeline using a single operation in a load store unit.

To further describe some implementations in greater detail, reference is next made to examples of techniques for a single memory macro-op interfacing with multiple vector micro-ops to load vector data. FIG. 5 is a flowchart of an example of a technique 500 for a single memory macro-op interfacing with multiple vector micro-ops to load or store vector data. In particular, the technique 500 may be performed for a vector memory instruction in a processor pipeline. The technique 500 can be executed using an integrated circuit, such as the integrated circuit of FIG. 3, having a processing core with a vector pipeline and a baler unit. The technique 500 can be performed, for example, by executing a vector memory instruction in a processing core.

The technique 500 includes decoding 502 a vector memory instruction into a macro-op for execution by a load store unit and a vector pipeline, dispatching 504 the macro-op to the load store unit and the vector pipeline, cracking 506 the macro-op into multiple micro-ops for execution by a baler unit of the vector pipeline, transferring 508 data between one or more addresses in the memory system and one or more entries of a buffer of a baler unit, and transferring 510 data between the one or more entries of the buffer and one or more registers of a vector physical register file. In some implementations, the technique 500 may be implemented using the processor core 306 of FIG. 3.

Decoding 502 a vector memory instruction into a macro-op for execution by a load store unit and a vector pipeline may be performed by evaluating the vector memory instruction to determine that the vector memory instruction is a vector memory instruction that requires coordination between a load store unit and a vector pipeline to access a vector physical register file of the vector pipeline. For example, referring to the system 300 of FIG. 3, the fetch logic 316 can fetch a vector memory instruction and the decode logic 318 can decode the vector memory instruction into a macro-op that can be executed using both the vector execution unit 324 and the LSU 326.

Dispatching 504 the macro-op to the load store unit and the vector pipeline may be performed by a dispatch stage in a processor pipeline. A rename unit may additionally rename the logical register arguments of the macro-op to map a logical register to a physical register of the vector physical register file. For example, referring to FIG. 3, the rename logic 320 may include dispatch logic that can send the macro-op to the vector execution unit 324 and the LSU 326 for execution. The rename logic 320 can also rename the arguments of the macro-op to map a logical register referenced by the macro-op to the physical register file 328 of the vector execution unit 324.

Cracking 506 the macro-op into multiple micro-ops may be performed by determining the number of vector registers required to store the vector data. The macro-op can be cracked into multiple micro-ops with each micro-op corresponding to a physical register of the vector execution unit. For example, if the vector data will require six registers the macro-op can be cracked into six different micro-ops. The macro-op may be cracked using a buffer/sequencer to assign a sequence number to each micro-op to keep the data in order. For example, referring to FIG. 3, the buffer/vector sequencer 330 can crack the macro-op into multiple micro-ops according to the number of registers in the physical register file 328 that will be required to store the data. The buffer/sequencer 330 can assign a sequence number to each micro-op.

Transferring 508 data between one or more addresses in the memory system and one or more entries of a buffer of a baler unit may be performed by a load store unit accessing a memory location identified in the macro-op. For example, the vector instruction may be a vector load instruction, and the macro-operation may cause the load store unit to transfer data from the one or more addresses in the memory system to the one or more entries of the buffer. For example, the vector instruction may be a vector store instruction, and the macro-operation may cause the load store unit to transfer data from the one or more entries of the buffer to the one or more addresses in the memory system. Note that step 508 may be performed before (e.g., in the case of a vector load instruction) or after (e.g., in the case of a vector store instruction) step 510. In some implementations, a sequencer of a load store unit may crack the macro-op into multiple micro-ops for retrieving portions of the vector data. For example, the load store unit may access data in memory in blocks corresponding to cache lines or a width of a bus connecting the processor core to a memory system, while the baler unit may transfer data in portions corresponding to a register width of the vector physical register file or a datapath width of a vector pipeline including the vector physical register file.

Transferring 510 data between the one or more entries of the buffer and one or more registers of a vector physical register file may be performed by the baler unit accessing an entry in the buffer and transferring the data to a physical register of a vector execution unit. For example, the vector instruction may be a vector load instruction, and the micro-operations may cause the baler unit to transfer data stored in the one or more entries of the buffer to registers of the vector register file. For example, the vector instruction may be a vector store instruction, and the multiple micro-operations may transfer data stored in registers of the vector register file to the one or more entries of the buffer. In some implementations, the baler unit sequences through the micro-ops, transferring one full width register from the load store unit for each micro-op until the micro-ops are exhausted. For example, referring to FIG. 3, the load store unit can access the memory system to load the data from the location identified in the macro-op. The data may be held until it is claimed by the baler unit with the sequence of micro-ops. In some implementations, the baler unit sequences through the micro-ops and transfers a full register width amount of data to a corresponding buffer in the baler unit.

For example, referring to FIG. 3, the baler unit can transfer data stored in an entry of the buffer and transmit the data to a corresponding physical register. The baler unit may translate between a ROB ID tag associated with the buffer entry and a vector physical register file.

Figure 6:
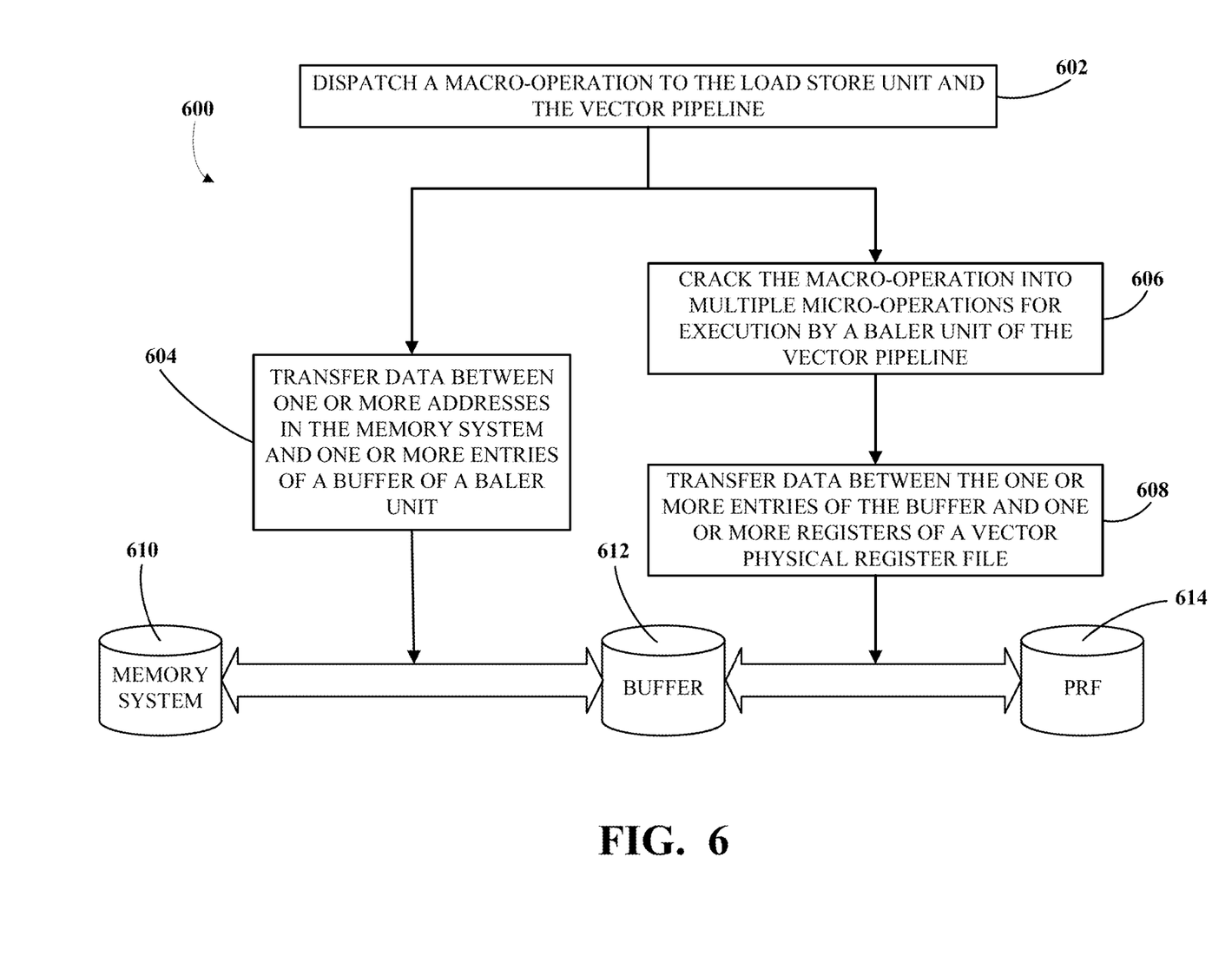
FIG. 6 is a flow chart of an example of a technique for implementing vector memory instructions in a vector pipeline using a single operation in a load store unit.

FIG. 6 is a flowchart of an example of a technique 600 for a single memory macro-op interfacing with multiple vector micro-ops to load vector data. In particular, the technique 600 may be performed for a vector memory instruction in a processor pipeline. The technique 600 can be executed using an integrated circuit, such as the integrated circuit of FIG. 3, having a processing core with a vector pipeline and a baler unit. The technique 600 can be performed, for example, by executing a vector memory instruction in a processing core. The steps, or operations, of the technique 600 or another technique, method, process, or algorithm described in connection with the implementations disclosed herein can be implemented directly in hardware, firmware, software executed by hardware, circuitry, a software simulation, or a combination thereof.

The technique 600 includes dispatching 602 a macro-op to the load store unit and the vector pipeline, transferring 604 data between one or more addresses in the memory system 610 and one or more entries of a buffer 612 of a baler unit, cracking 606 the macro-op into multiple micro-op for execution by a baler unit of the vector pipeline, and transferring 608 data between the one or more entries of the buffer 612 and one or more registers of a vector physical register file 614. In some implementations, the technique 600 may be implemented using the processor core 306 of FIG. 3.

Dispatching 602 the macro-op to the load store unit and the vector pipeline may be performed by a rename unit in a processor pipeline. The rename unit may additionally rename the macro-op to map the macro-op from a logical register to a physical register of the vector execution unit. For example, referring to FIG. 3, the rename logic can send the macro-op to the vector execution unit 324 and the load store unit 326. The rename logic can also rename the macro-op to map the logical register referenced by the macro-op to the physical register file 328 of the vector execution unit.

Transferring 604 data between one or more addresses in the memory system 610 and one or more entries of a buffer 612 of a baler unit may be performed by a load store unit accessing a memory location identified in the macro-op. The load store unit loads a full register width of data from the memory system 610 and the baler unit transfers the full register width of data from the load store unit to a buffer 612 of the baler unit. The baler unit sequences through the micro-ops transferring one full width register from the load store unit for each micro-op until the micro-ops are exhausted. For example, referring to FIG. 3, the load store unit can access the memory system to load the data from the location identified in the macro-op. The data is held at a full register width buffer until it is claimed by the baler unit. The baler unit sequences through the micro-ops and transfers a full register width amount of data to a corresponding buffer in the baler unit.

Cracking 606 the macro-op into multiple micro-ops may be performed by determining the number of vector registers required to store the vector data. The macro-op can be cracked into multiple micro-ops with each micro-op corresponding to a physical register of the vector execution unit. For example, if the vector data will require six registers the macro-op can be cracked into six different micro-ops. The macro-op may be cracked using a buffer/sequencer to assign a sequence number to each micro-op to keep the data in order. For example, referring to FIG. 3, the buffer/vector sequencer 330 can crack the macro-op into multiple micro-ops according to the number of registers in the physical register file 328 that will be required to store the data. The buffer/sequencer 330 can assign a sequence number to each micro-op.

Transferring 608 data between the one or more entries of the buffer 612 and one or more registers of a vector physical register file 614 may be performed by the baler unit accessing an entry in the buffer 612 and transferring the data to a vector physical register file 614 of a vector execution unit. For example, referring to FIG. 3, the baler unit can transfer data stored in an entry of the buffer and transmit the data to a corresponding physical register. In some implementations, the baler unit may translate between a ROB ID tag associated with the buffer entry and a vector physical register file.

In a first aspect, the subject matter described in this specification can be embodied in integrated circuit for executing instructions that includes a vector pipeline configured to execute vector instructions and comprising a vector physical register file; a load store unit configured to execute memory instructions to transfer data to and from a memory system; one or more pipeline stages configured to decode a vector memory instruction to obtain a macro-op and dispatch the macro-op to both the load store unit and the vector pipeline, wherein the vector pipeline is configured to crack the macro-op into multiple micro-ops; and a baler circuitry, including a buffer with entries, wherein the baler circuitry is configured to implement the multiple micro-ops to transfer data between one or more selected entries of the buffer and respective registers of the vector physical register file, and wherein the load store unit is configured to implement the macro-op to transfer data between one or more addresses in the memory system and the one or more selected entries of the buffer.

In the first aspect, the baler circuitry may include a data store configured to store identifiers associated with respective entries of the buffer, wherein one of the identifiers is associated with both the macro-op and the multiple micro-ops. In the first aspect, the vector memory instruction may be a vector load instruction, the macro-op may cause the load store unit to transfer data at one more addresses in the memory system to the one or more selected entries of the buffer, and the micro-ops may cause the baler circuitry to transfer data stored in the one or more selected entries of the buffer to registers of the vector register file. In the first aspect, the vector memory instruction may be a vector store instruction, the micro-ops may transfer data stored in registers of the vector register file to the one or more selected entries of the buffer, and the macro-op may cause the load store unit to transfer data from the one or more selected entries of the buffer to one or more addresses in the memory system. In the first aspect, the one or more addresses in the memory system are determined based on a base address identified by the vector memory instruction and one or more registers of indices. In the first aspect, the one or more addresses in the memory system may be determined based on a base address identified by the vector memory instruction and a stride parameter of the vector memory instruction. In the first aspect, the baler circuitry may further comprise a load transpose buffer. In the first aspect, the baler circuitry may further comprise a store transpose buffer. In the first aspect, the baler circuitry may further comprise a transpose buffer for transposing loads and stores. In the first aspect, entries of the transpose buffer may be divided into at least two pools including a first pool for storing oldest data and a second pool for storing new data. In the first aspect, the load store unit may be configured to initiate a flush of the transpose buffer to free resources allocated to younger entries. In the first aspect, the macro-op may be cracked into the micro-ops by a vector sequencer stage of the vector pipeline, and the micro-ops may be dispatched to the baler circuitry for execution.

In a second aspect, the subject matter described in this specification can be embodied in techniques for transferring data between a memory system and a vector register file. The techniques may include decoding a vector instruction into a macro-op for execution by a load store unit and a vector pipeline, dispatching the macro-op to the load store unit and the vector pipeline, cracking the macro-op into multiple micro-ops for execution by a baler unit of the vector pipeline, transferring, responsive to execution of the macro-op, data between one or more addresses in the memory system and one or more entries of a buffer of a baler unit, and transferring, responsive to execution of the multiple micro-ops, data between the one or more entries of the buffer and one or more registers of a vector physical register file.

In the second aspect, the techniques may include storing identifiers associated with respective entries of the buffer, wherein one of the identifiers may be associated with both the macro-op and the multiple micro-ops. In the second aspect, the identifier associated with both the macro-op and the multiple micro-ops may be a reorder buffer identifier. In the second aspect, the vector instruction may be a vector load instruction, the macro-op may cause the load store unit to transfer data from the one or more addresses in the memory system to the one or more entries of the buffer, and the micro-ops may cause the baler unit to transfer data stored in the one or more entries of the buffer to registers of the vector register file. In the second aspect, the vector instruction may be a vector store instruction, the micro-ops may transfer data stored in registers of the vector register file to the one or more entries of the buffer, and the macro-op may cause the load store unit to transfer data from the one or more entries of the buffer to the one or more addresses in the memory system. In the second aspect, the one or more addresses in the memory system may be determined based on a base address identified by the vector memory instruction and one or more registers of indices. In the second aspect, the one or more addresses in the memory system may be determined based on a base address identified by the vector memory instruction and a stride parameter of the vector memory instruction. In the second aspect, the one or more addresses in the memory system may be determined based on a mask register. In the second aspect, the technique may further include supplying a list of entry numbers to the load store unit and returning a selected entry number of the list of entry numbers when transferring data between the one or more addresses in the memory system and the buffer.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for transferring data between a memory system and a vector register file, comprising:
   decoding a vector instruction into a macro-operation for execution by a load store unit and a vector pipeline;
   dispatching the macro-operation to the load store unit and the vector pipeline;
   cracking the macro-operation into multiple micro-operations for execution by a baler unit of the vector pipeline;
   transferring, responsive to execution of the macro-operation, data between one or more addresses in the memory system and one or more entries of a buffer of a baler unit; and
   transferring, responsive to execution of the multiple micro-operations, data between the one or more entries of the buffer and one or more registers of a vector physical register file.

2. The method of claim 1, further comprising storing identifiers associated with respective entries of the buffer, wherein one of the identifiers is associated with both the macro-operation and the multiple micro-operations.

3. The method of claim 2, wherein the identifier associated with both the macro-operation and the multiple micro-operations is a reorder buffer identifier.

4. The method of claim 1, wherein the vector instruction is a vector load instruction, the macro-operation causes the load store unit to transfer data from the one or more addresses in the memory system to the one or more entries of the buffer, and the micro-operations cause the baler unit to transfer data stored in the one or more entries of the buffer to registers of the vector register file.

5. The method of claim 1, wherein the vector instruction is a vector store instruction, the multiple micro-operations transfer data stored in registers of the vector register file to the one or more entries of the buffer, and the macro-operation causes the load store unit to transfer data from the one or more entries of the buffer to the one or more addresses in the memory system.

6. The method of claim 1, further comprising:
   supplying a list of entry numbers to the load store unit; and
   returning a selected entry number of the list of entry numbers when transferring data between the one or more addresses in the memory system and the buffer.

7. An integrated circuit, comprising:
   a vector pipeline configured to execute vector instructions and comprising a vector physical register file;
   a load store unit configured to execute memory instructions to transfer data to and from a memory system;
   one or more pipeline stages configured to decode a vector memory instruction to obtain a macro-operation and dispatch the macro-operation to both the load store unit and the vector pipeline, wherein the vector pipeline is configured to crack the macro-operation into multiple micro-operations; and
   a baler circuitry, including a buffer with entries, wherein the baler circuitry is configured to implement the multiple micro-operations to transfer data between one or more selected entries of the buffer and respective registers of the vector physical register file, and wherein the load store unit is configured to implement the macro-operation to transfer data between one or more addresses in the memory system and the one or more selected entries of the buffer.

8. The integrated circuit of claim 7, wherein the baler circuitry includes a data store configured to store identifiers associated with respective entries of the buffer, wherein one of the identifiers is associated with both the macro-operation and the multiple micro-operations.

9. The integrated circuit of claim 8, wherein the identifier associated with both the macro-operation and the multiple micro-operations is a reorder buffer identifier.

10. The integrated circuit of claim 7, wherein the vector memory instruction is a vector load instruction, the macro-operation causes the load store unit to transfer data at one or more addresses in the memory system to the one or more selected entries of the buffer, and the micro-operations cause the baler circuitry to transfer data stored in the one or more selected entries of the buffer to registers of the vector register file.

11. The integrated circuit of claim 7, wherein the vector memory instruction is a vector store instruction, the micro-operations transfer data stored in registers of the vector register file to the one or more selected entries of the buffer, and the macro-operation causes the load store unit to transfer data from the one or more selected entries of the buffer to one or more addresses in the memory system.

12. The integrated circuit of claim 7, wherein the one or more addresses in the memory system are determined based on a base address identified by the vector memory instruction and one or more registers of indices.

13. The integrated circuit of claim 7, wherein the one or more addresses in the memory system are determined based on a base address identified by the vector memory instruction and a stride parameter of the vector memory instruction.

14. The integrated circuit of claim 7, wherein the one or more addresses in the memory system are determined based on a mask register.

15. The integrated circuit of claim 7, wherein the baler circuitry further comprises a load transpose buffer.

16. The integrated circuit of claim 7, wherein the baler circuitry further comprises a store transpose buffer.

17. The integrated circuit of claim 7, wherein the baler circuitry further comprises a transpose buffer for transposing loads and stores.

18. The integrated circuit of claim 17, wherein entries of the transpose buffer are divided into at least two pools including a first pool for storing oldest data and a second pool for storing new data.

19. The integrated circuit of claim 18, wherein the load store unit is configured to initiate a flush of the transpose buffer to free resources allocated to younger entries.

20. The integrated circuit of claim 10, wherein the macro-operation is cracked into the micro-operations by a vector sequencer stage of the vector pipeline, and the micro-operations are dispatched to the baler circuitry for execution.

* * * * *